Aug. 12, 1941.  W. EGLINTON ET AL  2,252,285
SOUNDPROOF WALL STRUCTURE
Original Filed March 31, 1936
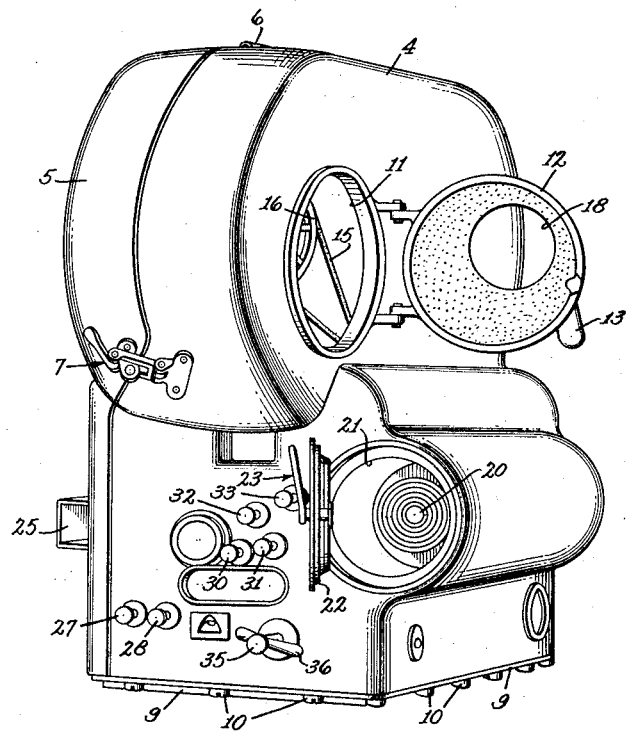
Fig. 1.
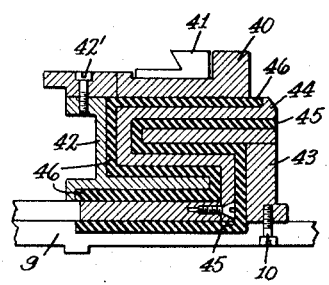
Fig. 2.
Fig. 3.
Inventor
WILLIAM EGLINTON,
HARRY G. CUNNINGHAM,
By Orl R. Goshaw
Attorney Patented Aug. 12, 1941

2,252,285

UNITED STATES PATENT OFFICE 2,252,285

SOUNDPROOF WALL STRUCTURE

William Eglinton, Reseda, and Harry Gail Cunningham, Los Angeles, Calif., assignors to Radio Corporation of America, a corporation of Delaware Original application March 31, 1936, Serial No. 71,864. Divided and this application August 2, 1938, Serial No. 222,628

4 Claims. (Cl. 154—45.9)

The present invention relates to camera blimps and more particularly to the sound-proof wall structure thereof, this application being a division of our co-pending application S. N. 71,864, filed March 31, 1936, entitled Camera blimps, which has now matured into Patent No. 2,179,817, dated November 14, 1939.

The invention involves a novel wall construction which provides efficient sound insulation as well as a sturdy and rugged structure readily adaptable to different forms and shapes. Although providing the necessary stiffness to maintain its form, it does not have a diaphragm effect found in the stiffening components of other types of sound-proof walls. The stiffening element of the present invention involves a welded skeleton of wire-mesh, the interstices of which are filled with acoustic plaster. Upon this stiffening member are applied alternate layers of felt and rubber with finally a layer of leatherette, upon which a coating of lacquer is applied. Because of its excellent sound-insulating properties and formability, this construction is particularly suitable for picture camera blimps to prevent the noise of the enclosed motor and camera mechanism from reaching the associated microphone.

An object of the present invention, therefore, is to provide a more efficient and efficacious sound-proof wall structure.

Another object of the invention is to provide a camera blimp having a sound-proof wall structure with the required stiffness and sound-insulating properties.

Another object of the invention is to provide a vibration insulated support for a motion picture camera and its associated blimp.

Although the novel features which are believed to be characteristic of this invention are pointed out with particularity in the claims appended herewith, the manner of its organization and the mode of its operation will be better understood by referring to the following description read in conjunction with the accompanying drawing forming a part thereof, in which Fig. 1 is a perspective view from the rear right-hand corner of a blimp constructed of the sound-proof material of the invention;

Fig. 2 is a detailed sectional view of the construction of one of the lower corner supports for the camera within the blimp; and Fig. 3 is a cross-sectional view of the new sound-proof wall material.

Referring now to the drawing, the blimp casing shown in Fig. 1 comprises a section 4 and a section 5 hinged at 6 and secured together by clamps, one of which is shown at 7. The section 4 is affixed to the base plate 9 by means of screws 10, this base plate, of course, being supported upon the customary motion picture camera tripod (not shown).

In Fig. 2, one of the supporting corners of the camera is shown in cross-section to illustrate the manner of insulating the supporting base plate 9 from the camera. The body of the camera support 40, carrying ways 41 for the camera, is secured to a metallic member 42 by screws 42′ while a further metallic member 43 is secured to the base 9. An additional metallic element 44 corresponding in configuration to the spaces between the elements 42 and 43 is located midway between them, but separated therefrom by layers of rubber 45 and 46. The layer of rubber 45 is interposed between the members 43 and 44, while the similar layer of rubber 46 is interposed between the members 40 and 44. This type of interdigitated, insulated joint prevents the vibrations of the camera from being transmitted to the base, and, consequently, to the tripod to produce noise which might reach the microphone.

Referring now to Fig. 3, the specific type of wall construction which has been found to be particularly useful for a blimp of the type shown in Fig. 1 is disclosed. The stiffening component of the wall mentioned above is composed of zigzag steel members which are welded together to form a skeleton mesh 50. The interstices of the skeleton 50 are filled with acoustic plaster, one preferred form of which is ground-up sponge cemented together with rubber cement. This sponge is of the well known type sold for household use. The filled mesh 50 is lined on the interior with a layer of rubber 51 and an innerlining of felt 52. Continuing now toward the outer portion of the wall, there is first applied to the mesh 50 a layer of felt 53, then a layer of rubber 54, another layer of felt 55, a further layer of rubber 56, a third layer of felt 57 and finally a layer of leatherette 58 covered by a coating of lacquer 59. This laminated wall construction provides remarkably effective sound insulation for keeping the noises of the camera entirely within the blimp. This sound-proof or sound-insulating wall construction is particularly efficient not only because of its alternate layers of felt and rubber forming a combination of high efficiency, but for its mesh wire skeleton filled with the acoustic plaster. This type of stiffening element is aperiodic and not resonant to any particular frequency of vibration, such as the usual type of stiffening elements of other sound-proof wall structures which form a diaphragm effect at certain sound frequencies or vibrations, which decrease their effectiveness. The present construction does not have this defect and is, therefore, particularly desirable as a sound-insulating construction for camera blimps, one preferred form of which is shown in Fig. 1.

Referring again to Fig. 1, a motion picture camera is located in the lower portion of the casing, a motor 20 driving the takeup reel located in the upper half of the casing with a supply reel. Through the opening 11, which is closed by a door 12 having a latch handle 13 thereon, is seen a belt 15 and a pulley 16 which couple the motor with the tapeup reel. The door 12 has a window 18 therein for viewing the operation of the takeup mechanism.

The motor 20 is seen through an opening 21 closed by a door 22 secured by a clamp-and-handle combination 23. Various operating camera levers are shown extending through the rear portion of the blimp, while the rear of a finder is shown at 25. Some of the actuating elements shown are buttons 27 and 28 used to insert appropriate filter glasses before the film in the camera, and buttons 30 and 31 for controlling the dissolve mechanism of the camera. Knob 32 controls the shutter setting of the camera; knob 33 controls the magnification of the focusing device of the camera, while handle 36, which is latched by a button 35, is for moving the camera laterally from the "taking" to the "focusing" position and vice versa. The connections of these control elements with the camera are shown in detail in the above-identified parent application, it being noted, however, that means are provided for disconnecting the interior mechanism with the exterior control elements during operation of the camera to prevent vibrations from being transmitted by the connections through the blimp walls.

The manner in which the casing conforms to the various portions of the interior mechanism is to be noted as well as the smoothness of the various corners, this being possible by the use of the above-described wall structure.

We claim:

1. In a sound-proof structure, a supporting frame comprising a wire-mesh skeleton, sound-absorbing material in the interstices of said wire-mesh, a layer of rubber and an adjacent inner layer of felt on one side of said frame, a plurality of alternate layers of felt and rubber on the other side of said frame, and an external layer of leatherette covered by a coating of lacquer.

2. In a sound-proof structure, a wire-mesh skeleton for forming and maintaining the shape of said structure, a sound-absorbing material in the interstices of said wire-mesh, and a layer of rubber and felt on one side of said mesh, and a plurality of alternate layers of felt and rubber on the other side of said mesh.

3. In a sound-proof structure, a wire-mesh skeleton for forming and maintaining the shape of said structure, a sound-absorbing material in the interstices of said wire-mesh, a layer of felt and rubber attached to said wire-mesh on the interior of said enclosure, and at least five alternate layers of rubber and felt on the exterior of said wire-mesh.

4. In a sound-proof structure, a wire-mesh skeleton having the interstices thereof filled with ground-up sponge bound together with rubber cement to form a supporting frame, a plurality of alternate layers of sound-absorbing material having different sound absorbing characteristics for covering said skeleton on one side, and a larger plurality of alternate layers of similar material covering the other side of said skeleton.

WILLIAM EGLINTON.
HARRY GAIL CUNNINGHAM.